United States Patent
Slaby et al.

(10) Patent No.: US 9,520,746 B2
(45) Date of Patent: Dec. 13, 2016

(54) BATTERY DISCONNECT SAFEGUARD

(71) Applicant: Motorola Mobility LLC, Chicago, IL (US)

(72) Inventors: Jiri Slaby, Buffalo Grove, IL (US); Mark Carlson, Arlington Heights, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/604,395

(22) Filed: Jan. 23, 2015

(65) Prior Publication Data
US 2016/0218556 A1    Jul. 28, 2016

(51) Int. Cl.
*H04M 1/02* (2006.01)
*H02J 9/06* (2006.01)
*H04W 52/02* (2009.01)
*H04M 1/725* (2006.01)

(52) U.S. Cl.
CPC ............ *H02J 9/06* (2013.01); *H04M 1/72569* (2013.01); *H04W 52/0254* (2013.01); *H04W 52/0296* (2013.01)

(58) Field of Classification Search
CPC ....... H01M 2/024; H02J 7/007; H04B 5/0043; H04B 5/0037; H05B 5/0031; H04M 1/7253; H04M 2250/04; H01R 31/3689
USPC ....... 455/426.1, 552.1, 343.6, 574; 320/134; 429/163, 179; 340/902; 315/158; 307/66
See application file for complete search history.

(56) References Cited

U.S. PATENT DOCUMENTS

2011/0309681 A1* 12/2011 Kamijima ............. H02J 7/0013
                                                                    307/66
2015/0001200 A1*  1/2015 Harper .................. G06F 1/1656
                                                                    219/209

OTHER PUBLICATIONS

Jiri Slaby, et al., "Battery Disconnect Safeguard", U.S. Appl. No. 14/604,378, filed Jan. 23, 2015.

* cited by examiner

*Primary Examiner* — Phuoc H Doan (57) ABSTRACT

In embodiments, a mobile device includes a primary battery as a power source to power components of the mobile device, and includes a secondary battery as an additional power source to power the components of the mobile device. A sensor is implemented to detect moisture proximate a battery connection of the secondary battery, where the detected moisture indicates an impending secondary battery disconnect event due to the secondary battery shorting out. A battery controller is implemented to receive a sensor input of the detected moisture from the sensor. The battery controller can then switch from the secondary battery to the primary battery as the power source based on the detected moisture proximate the battery connection of the secondary battery.

20 Claims, 5 Drawing Sheets

BATTERY DISCONNECT SAFEGUARD

BACKGROUND

Portable devices, such as mobile phones, tablet devices, digital cameras, and other types of computing and electronic devices can typically run low on battery power, particularly when a device is utilized extensively between battery charges. Some mobile devices are designed to attach and/or incorporate a secondary battery as an alternate or additional power source to the primary battery that powers a device. However, these secondary batteries can be susceptible to various external and environmental factors, causing a momentary (or longer-term) loss of power which leads to device shutdown. For example, a mobile device may be operating and powered by a secondary battery when the device is dropped. The resulting impact from the device being dropped may momentarily or permanently dislodge the battery connection causing device shutdown. Further, a secondary battery that is powering a device may be susceptible to moisture exposure, which can short-out the battery contacts causing the device to shut down while the device is being powered by the secondary battery.

BRIEF DESCRIPTION OF THE DRAWINGS

Embodiments of battery disconnect safeguard are described with reference to the following Figures. The same numbers may be used throughout to reference like features and components that are shown in the Figures.

DETAILED DESCRIPTION

Embodiments of battery disconnect safeguard are described, such as for any type of mobile device that may be implemented with both a primary battery and a secondary battery as an additional power source to power components of the device. For example, a mobile phone typically includes a primary battery that is integrated within the housing of the device and has a reliable, protected battery connection to power the device. The mobile phone may also include a secondary battery that can be switched-in as an additional power source to the primary battery to power the components of the mobile device. In various implementations, a secondary battery can be integrated within a mobile device, such as within the housing of the device, or integrated in a removable housing cover of the device, such as integrated in the removable battery cover of the device housing, or integrated in the removable protective cover or case for the whole device. Alternatively, a secondary battery may be connected to battery contacts that are integrated in the housing of the mobile device, such as for a secondary battery that clips onto or attaches externally to the device, or the secondary battery can be external to the device and connected by a cable or any other type of wired connection.

In any of the various secondary battery implementations, the battery connection of the secondary battery is susceptible to being inadvertently disconnected from the mobile device, such as due to various external or environmental factors as described above. For example, a user may drop a mobile phone and the resulting impact of the device with the ground or other hard object may momentarily or permanently dislodge the battery connection, causing device shutdown in an event that the secondary battery is powering the device. Similarly, a secondary battery that is powering a device may be susceptible to moisture exposure, which can short-out the battery contacts causing device shutdown or permanent damage to the device. A secondary battery, or at least the battery contacts, may be sealed or protected from environmental elements by a gasket or similar-type seal. However, a damaged seal or gasket can lead to moisture ingress, exposing the battery and/or the battery contacts to moisture that may short-out the battery.

The described aspects of battery disconnect safeguard provide that a mobile device being powered by a secondary battery as an alternate or additional power source will maintain continuous power to operate the device, rather than possible device shut-down caused by an impending secondary battery disconnect event due to the mobile device falling, or moisture exposure shorting-out the battery connections. Although not likely to damage the device when power is suddenly interrupted, the unexpected loss of power results in a poor user experience, and it is generally preferable to maintain device power in any operation or standby mode.

In one aspect of battery disconnect safeguard, an accelerometer is implemented to detect acceleration of the mobile device, which indicates that the device has been dropped and is falling with an impending impact that may interrupt device power. A battery controller is implemented to receive the detected acceleration as a sensor input from the accelerometer, and then controller logic initiates a battery switch circuit to switch from the secondary battery to the primary battery as the power source based on the detected acceleration of the mobile device. Additionally, a mobile device may be implemented with contact sensors that detect touch contact with the device, and the battery controller switches from the secondary battery to the primary battery based on both the detected acceleration of the mobile device and no detected touch contact with the mobile device. A detected touch contact with the mobile device is an indication that the device has not been dropped and/or is not falling.

In another aspect of battery disconnect safeguard, a moisture detector is implemented to detect moisture proximate the battery connection of the secondary battery in the mobile device, which may then result in a loss of device power or device damage if the secondary battery shorts-out. The battery controller is implemented to receive the detected moisture as a sensor input from the moisture sensor, and then the controller logic initiates the battery switch circuit to switch from the secondary battery to the primary battery as the power source based on the detected moisture. The battery controller can also be implemented to monitor the charge level of the primary battery, and maintain at least a minimum charge level of the primary battery to enable the switch from the secondary battery to the primary battery as the power source in the event that the controller logic of the battery controller initiates the battery switch.

While features and concepts of battery disconnect safeguard can be implemented in any number of different devices, systems, environments, and/or configurations, embodiments of battery disconnect safeguard are described in the context of the following example devices, systems, and methods.

Figure 1:
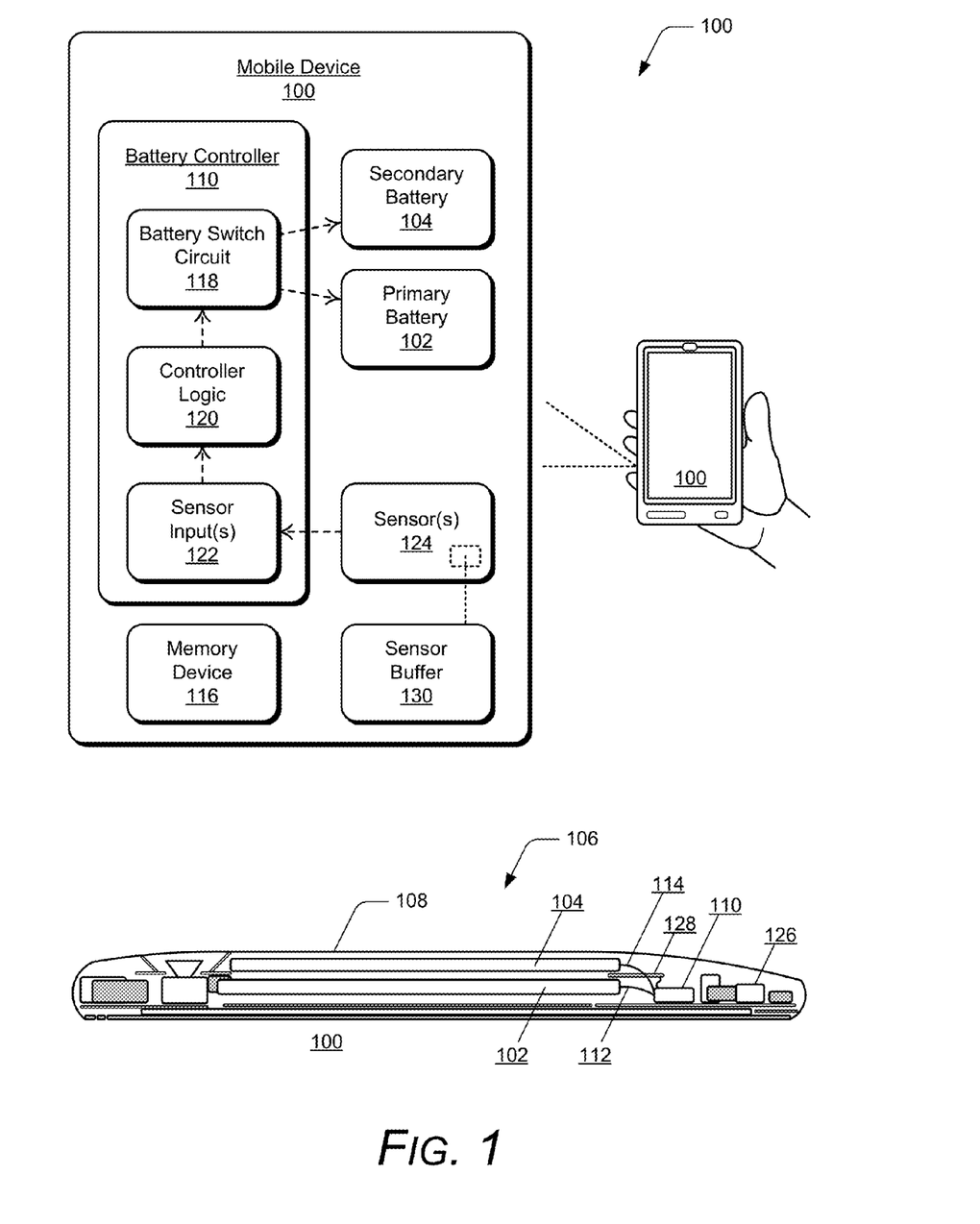
FIG. 1 illustrates an example system in which embodiments of battery disconnect safeguard can be implemented.

FIG. 1 illustrates an example mobile device 100 in which embodiments of battery disconnect safeguard can be implemented. The example mobile device 100 may be any type of mobile phone, tablet device, digital camera, or other types of computing and electronic devices that are battery powered. In this example, the mobile device 100 has a primary battery 102 as the power source to power various components of the device. Additionally, the mobile device 100 has a secondary battery 104 that is an additional power source to power the components of the device, and generally, the secondary battery is removable from the device. The various components of the mobile device 100 are shown in a side view 106 of the device, and also in a block diagram for illustrative discussion. In the example side view 106, the secondary battery 104 is shown integrated within the housing 108 of the mobile device 100.

Figure 2:
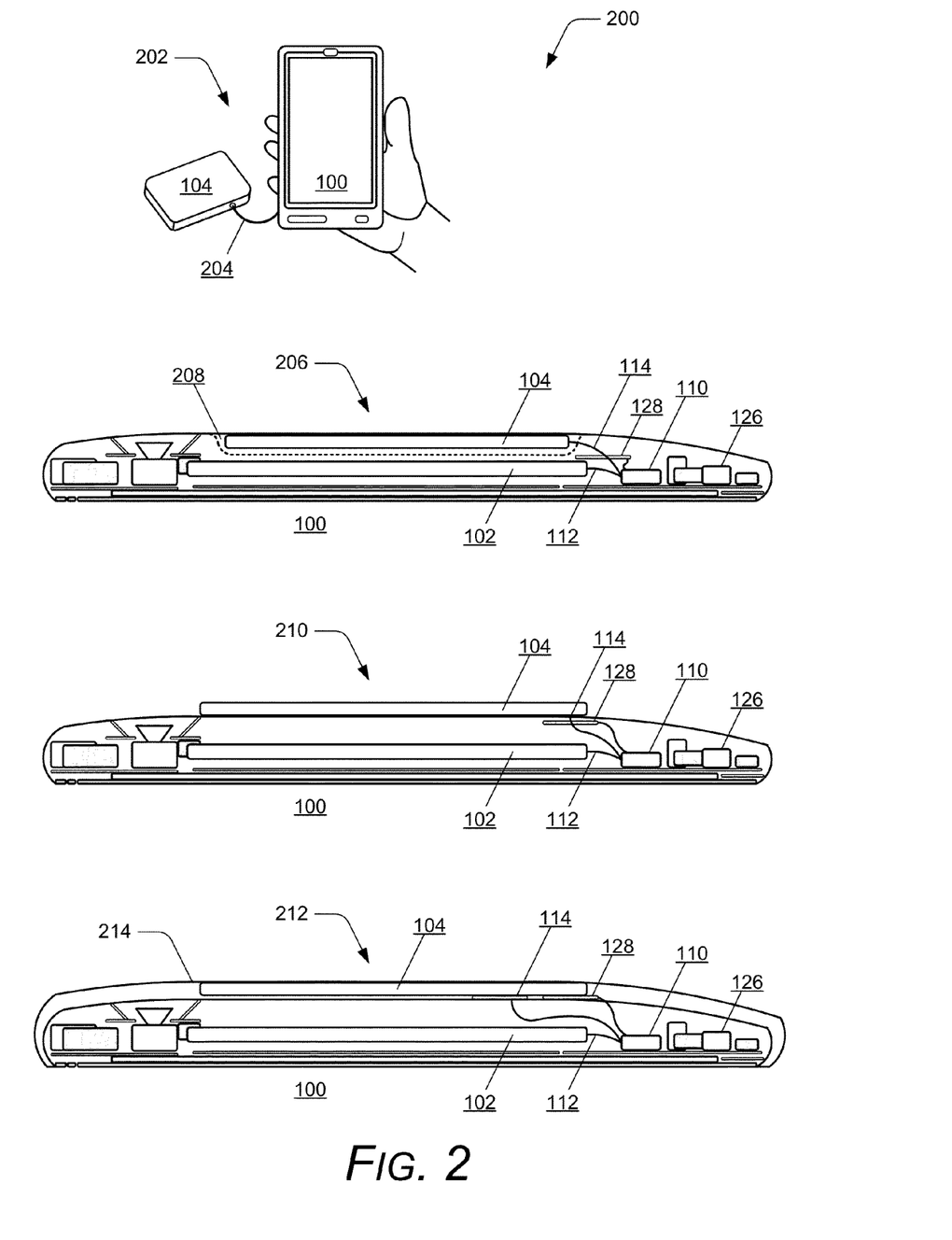
FIG. 2 further illustrates examples of a mobile device and various secondary battery configurations in which embodiments of battery disconnect safeguard can be implemented.

FIG. 2 illustrates various examples 200 of additional secondary battery configurations in which embodiments of battery disconnect safeguard can be implemented. As shown at 202, the secondary battery 104 may be external to the mobile device 100 and connected by a cable 204 or any other type of flexible and/or wired connection. Alternatively as shown in a side view 206, the secondary battery 104 may be integrated in a removable housing cover 208 of the mobile device 100, such as integrated in the removable battery cover of the device housing. Alternatively as shown in another side view 210, the secondary battery 104 may clip onto or attach externally to the mobile device 100, and is connected to battery contacts that are integrated in the housing 108 of the mobile device. Alternatively as shown in another side view 212, the secondary battery 104 may be integrated in a protective case or cover 214 for the mobile device 100, and the battery connection is configured on the external surface of the housing 108. When the protective cover with the integrated battery is positioned on the housing, the battery contacts in the protective cover contact the pads on the housing to create the battery connection with the device.

The mobile device 100 includes a battery controller 110 that is implemented to switch between the primary battery as the power source to power the components of the device, and the secondary battery as the alternate or additional power source to power the components of the device. As shown in the side view 106, the primary battery 102 is connected to the battery controller 110 via a battery connection 112. Similarly, the secondary battery 104 is connected to the battery controller 110 via a battery connection 114. In embodiments, the battery controller 110 can be implemented with hardware components, which are generally time-sensitive software implementation to safeguard the mobile device from a secondary battery disconnect event, and sudden loss of power.

Additionally, the mobile device 100 can be implemented with various components, such as a processing system and memory, as well as any number and combination of differing components as further described with reference to the example device shown in FIG. 5. As an alternative to hardware components, the battery controller 110 can be implemented as a software application or module, such as executable software instructions (e.g., computer-executable instructions) that are executable with a processing system of the device to implement embodiments of battery disconnect safeguard. The battery controller 110 can be stored on computer-readable storage memory (e.g., a memory device 116), such as any suitable memory device or electronic data storage implemented in the mobile device. In practice, the battery controller 110 may be implemented in software as part of an operating system of the mobile device. Additionally, a separate microcontroller may be implemented to process the battery controller 110 as software for a time-sensitive, quick response to a secondary battery disconnect event.

In this example, the battery controller 110 includes a battery switch circuit 118 that switches between the primary battery 102 and the secondary battery 104 as the power source to power the components of the device. The battery controller 110 also includes controller logic 120 that controls the battery switch circuit 118, which may be based on one or more sensor inputs 122 as described further below. As with the battery controller 110, the controller logic 120 may be implemented in hardware, software, or as a combination thereof.

The mobile device 100 also includes one or more sensors 124, which may be implemented as any one or combination of an accelerometer, gyro, touch contact sensors, a moisture detector, temperature detector, and/or any other type of environmental condition sensors. In aspects of battery disconnect safeguard, a sensor 124 is implemented as an accelerometer 126 to detect acceleration of the mobile device 100, which can indicate an impending secondary battery disconnect event due to the mobile device falling. For example, a detected acceleration of approximately 9.8 m/s$^2$ (meters per second squared) indicates a device falling based on gravitational acceleration. In practice, the accelerometer 126 can be implemented to detect a range of acceleration, such as an approximate range between 9.75 m/s$^2$ and 9.85 m/s$^2$, which can then be interpreted as a device falling. Alternatively or in addition, a sensor 124 is implemented as a moisture detector 128 to detect moisture proximate the battery connection of the secondary battery 104 in the mobile device 100, which can indicate an impending secondary battery disconnect event due to the secondary battery shorting out.

In an aspect of battery disconnect safeguard, the battery controller 110 is implemented to receive a sensor input 122 of detected acceleration of the mobile device 100 from the accelerometer 126 (e.g., a sensor 124), and then initiate a switch from the secondary battery 104 to the primary battery 102 as the power source based on the detected acceleration of the mobile device. As described above, an acceleration of the mobile device 100 can indicate that the device has been dropped and is falling, in which case the impending impact with the ground or other hard object may dislodge the battery connection of the secondary battery, causing a device shutdown in an event that the secondary battery is powering the device. Similarly, the detected acceleration of the mobile device 100 may indicate that the device has been thrown, in which case the device may impact a hard surface and/or then the ground, also resulting in a disconnect of the secondary battery connection.

As an additional safeguard, the sensors 124 of the mobile device 100 may include one or more contact sensors (e.g., device perimeter touch sensors) configured to detect touch contact with the mobile device, such as when a user holds the device. If the battery controller 110 receives a sensor input 122 as detected acceleration of the device from the accelerometer 126, yet a contact sensor (e.g., a sensor 124) detects user touch contact with the device, the controller logic 120 can determine that an impact is not imminent or pending, such as from the device falling or being thrown. For example, the accelerometer 126 may detect acceleration of the mobile device 100 in a vehicle while one or more contact sensors detect user touch contact with the device, indicating that the device is not falling. Alternatively however, the controller logic 120 of the battery controller 110 is implemented to initiate the battery switch circuit 118 switching from the secondary battery 104 to the primary battery 102 based on both detected acceleration of the mobile device 100 and no detected touch contact with the device. It should be noted that the battery controller 110 is also implemented to initiate the battery disconnect safeguards if the mobile device is in a standby mode, such as if the display is turned off, but the device is still otherwise powered and operational.

The battery controller 110 is also implemented to monitor a charge level of the primary battery 102, and maintain at least a minimum charge level of the primary battery to enable a switch from the secondary battery 104 to the primary battery 102 as the power source. Generally, the primary battery 102 will serve as a back-up power source with a minimum charge (such as 5%) for the short period of time needed to support a switch from the secondary battery 104 to the primary battery 102 during an impending disconnect of the secondary battery connection. Alternatively, a small cell battery or capacitor could be utilized as the back-up power source in the mobile device. When a fall and/or bounce of the mobile device 100 has completed, as determined based on a significant decrease in device acceleration (e.g., approximately zero acceleration), the battery controller 110 can initiate switching back to the secondary battery 104 from the primary battery 102 as the power source of the components of the device. In an event that the battery controller detects the primary battery 102 has been depleted of power without maintaining at least a minimum charge, then the battery controller 110 is implemented to not initiate the switch from the secondary battery 104 to the primary battery 102 as the power source.

In implementations of battery disconnect safeguard, a log of detected acceleration data can be maintained as a record of the device acceleration. For example, the accelerometer 126 (e.g., a sensor 124) may be implemented with a sensor buffer 130 to maintain the log data of the detected acceleration. Alternatively or in addition, the log data can be streamed to the memory device 116 of the mobile device 100 to maintain the log data as a record of the detected acceleration of the device.

In another aspect of battery disconnect safeguard, the battery controller 110 is implemented to receive a sensor input 122 of moisture that is detected proximate the battery connection of the secondary battery 104. The mobile device 100 includes the moisture detector 128 that is implemented to detect moisture in the device and/or proximate the battery connection of the secondary battery 104. The moisture detector 128 can be implemented to detect moisture on a circuit board that implements the battery controller, at the battery connection of the secondary battery itself, and/or proximate the battery connection. In implementations, the battery connection may be configured on the external surface of the housing, and when the protective cover with an integrated battery is positioned on the housing, the battery contacts in the protective cover contact the pads on the housing to create the battery connection with the device. As described above, moisture ingress may occur due to a damaged gasket or seal that is designed to prevent the battery and/or battery contacts from moisture exposure that may short-out the battery. For example, the mobile device 100 may fall into a puddle of water, which leads to moisture proximate the battery contacts of the secondary battery. The battery controller 110 can receive a sensor input 122 of detected moisture from the moisture detector 128 (e.g., a sensor 124), and then initiate a switch from the secondary battery 104 to the primary battery 102 as the power source based on the detected moisture.

In aspects of battery disconnect safeguard, other environmental factors may also be considered, such as exposure of the secondary battery to cold or heat outside of an expected operating temperature range. For example, a secondary battery that is configured external to the mobile device may become overheated when exposed to direct sunlight, such as the external wired secondary battery shown at 202 (FIG. 2), or the secondary battery that is connected to the external housing of the mobile device as shown in the side view 210. Similarly, a secondary battery may overheat due to the external temperature and while charging the battery.

Additionally, a secondary battery may not perform to power the mobile device 100 if left in a cold environment, such as outside or in a vehicle. In any of these scenarios, the battery controller 110 can receive a sensor input 122 from a temperature sensor (e.g., a sensor 124), and then the controller logic 120 can initiate a switch from the secondary battery 104 to the primary battery 102 as the power source based on the detected temperature and/or operating condition. As similarly noted above, the controller logic 120 of the battery controller 110 can initiate the battery switch circuit 118 to switch back to the secondary battery 104 from the primary battery 102 as the power source of the components of the mobile device 100 when the moisture is no longer detected (e.g., has dried) and/or when the temperature and other conditions return to an expected operating range.

Example methods 300 and 400 are described with reference to respective FIGS. 3 and 4 in accordance with implementations of battery disconnect safeguard. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
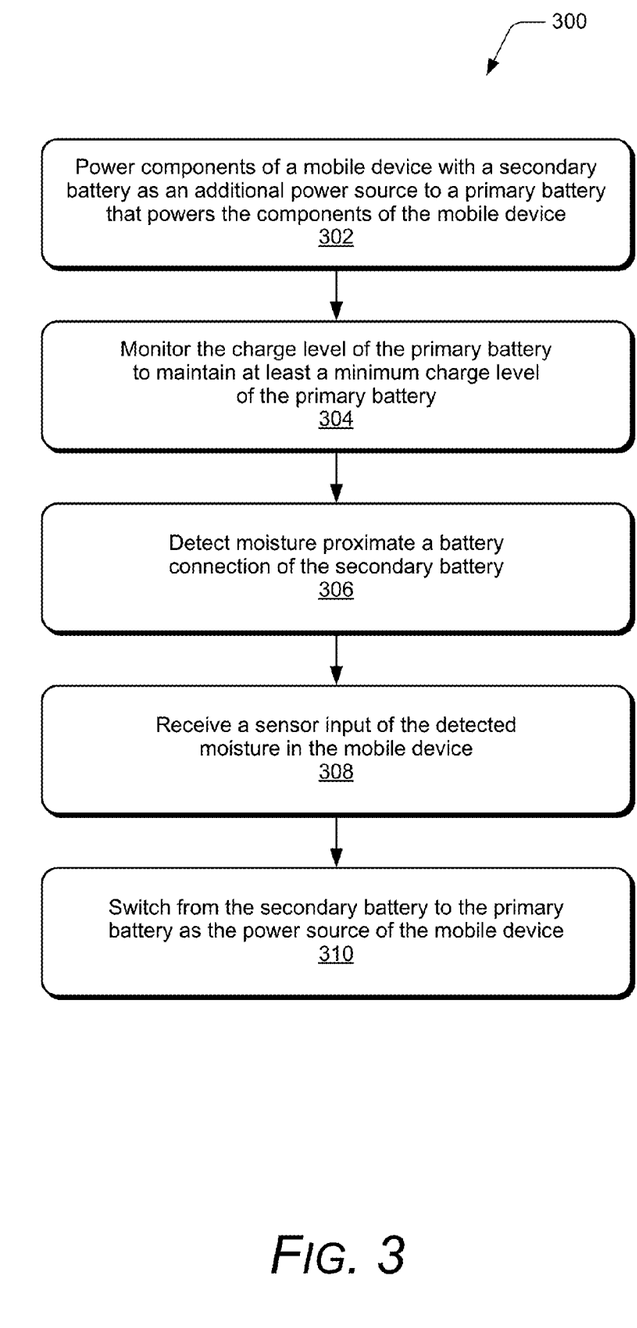
FIG. 3 illustrates an example method of battery disconnect safeguard in accordance with one or more embodiments related to maintaining continuous power for a mobile device when subject to an impending secondary battery disconnect event due to moisture exposure.

FIG. 3 illustrates example method(s) 300 of battery disconnect safeguard and is described with reference to maintaining continuous power for a mobile device when subject to an impending secondary battery disconnect event due to moisture exposure. The order in which the method is described is not intended to be construed as a limitation, and any number or combination of the described method operations can be performed in any order to perform a method, or an alternate method.

At 302, components of a mobile device are powered with a secondary battery as an additional power source to a primary battery that powers the components of the mobile device. For example, the mobile device 100 (FIG. 1) has a primary battery 102 as the power source to power the various components of the device, and the mobile device includes a secondary battery 104 that can be switched-in as the alternate or additional power source to power the components of the device. The mobile device 100 is shown with various configurations of the secondary battery 104 in FIGS. 1 and 2.

At 304, the charge level of the primary battery is monitored to maintain at least a minimum charge level of the primary battery. For example, the battery controller 110 of the mobile device 100 monitors the charge level of the primary battery 102, and maintains at least a minimum charge level of the primary battery to enable a switch from the secondary battery 104 to the primary battery 102 as the power source.

At 306, moisture is detected proximate a battery connection of the secondary battery. For example, the moisture detector 128 in the mobile device 100 detects moisture in the device and/or proximate the battery connection of the secondary battery 104, where the detected moisture indicates an impending secondary battery disconnect event due to the secondary battery shorting out. The moisture detector 128 can be implemented to detect moisture on a circuit board that implements the battery controller and/or at the battery connection of the secondary battery.

At 308, a sensor input of the detected moisture in the mobile device is received. For example, the battery controller 110 in the mobile device 100 receives a sensor input 122 of the moisture that is detected proximate the battery connection of the secondary battery 104 by the moisture detector 128. At 310, the secondary battery is switched to the primary battery as the power source of the mobile device. For example, the controller logic 120 initiates the battery switch circuit 118 of the battery controller 110 in the mobile device 100 to switch from the secondary battery 104 to the primary battery 102 as the power source based on the detected moisture proximate the battery connection of the secondary battery. Additionally, the controller logic 120 of the battery controller 110 can initiate the battery switch circuit 118 to switch back to the secondary battery 104 from the primary battery 102 as the power source of the components of the mobile device 100 when the moisture is no longer detected (e.g., has dried).

Figure 4:
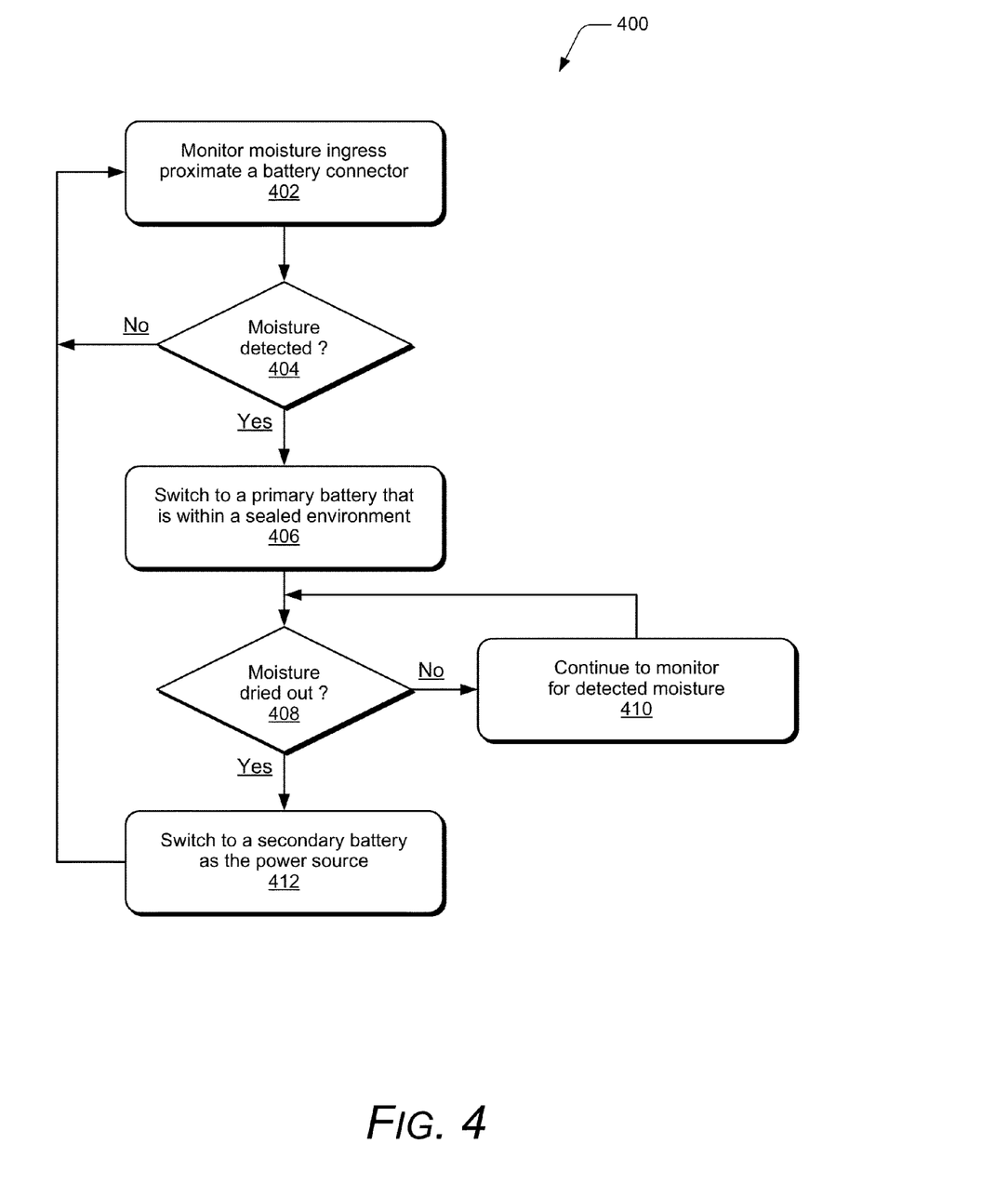
FIG. 4 illustrates another example method of battery disconnect safeguard in accordance with one or more embodiments related to maintaining continuous power for a mobile device when subject to an impending secondary battery disconnect event due to moisture exposure.

FIG. 4 illustrates example method(s) 400 of battery disconnect safeguard and, similar to the method described with reference to FIG. 3, is described with reference to maintaining continuous power for a mobile device when subject to an impending secondary battery disconnect event due to moisture exposure. The order in which the method is described is not intended to be construed as a limitation, and any number or combination of the described method operations can be performed in any order to perform a method, or an alternate method.

At 402, moisture ingress is monitored for moisture proximate a battery connector. For example, the moisture detector 128 in the mobile device 100 monitors for moisture in the device and/or proximate the battery connection of the secondary battery 104, where detected moisture can indicate an impending secondary battery disconnect event due to the secondary battery shorting out.

At 404, a determination is made as to whether moisture is detected. For example, the battery controller 110 of the mobile device 100 can determine whether moisture has been detected based on the sensor inputs 122 from the moisture detector 128 (e.g., a sensor 124). If moisture is not detected in the mobile device 100 (i.e., "No" from 404), then the method continues at 402 to continue monitoring for moisture ingress and moisture proximate the battery connector. If moisture is detected (i.e., "Yes" from 404), then at 406, the primary battery that is within a sealed environment is switched to as the power source for the device. For example, the controller logic 120 initiates the battery switch circuit 118 of the battery controller 110 in the mobile device 100 to switch from the secondary battery 104 to the primary battery 102 as the power source based on the detected moisture proximate the battery connection of the secondary battery.

At 408, a determination is made as to whether the moisture has dried out (or is no longer detected). For example, the battery controller 110 in the mobile device 100 determines whether the moisture is still present in the device, or has dried out, based on the sensor inputs 122 from the moisture detector 128. If the moisture has not dried out (i.e., "No" from 408), then at 410, monitoring for the detected moisture continues. For example, the battery controller 110 continues to monitor the sensor inputs 122 from the moisture detector 128 to determine whether the moisture is still present in the device and/or proximate the battery connectors of the secondary battery. If the moisture has dried out (i.e., "Yes" from 408), then at 412, the secondary battery is switched to as the power source of the device. For example, the controller logic 120 initiates the battery switch circuit 118 of the battery controller 110 to switch from the primary battery 102 back to the secondary battery 104, and the method then continues at 402 to continue monitoring for moisture ingress and moisture proximate the battery connectors.

Figure 5:
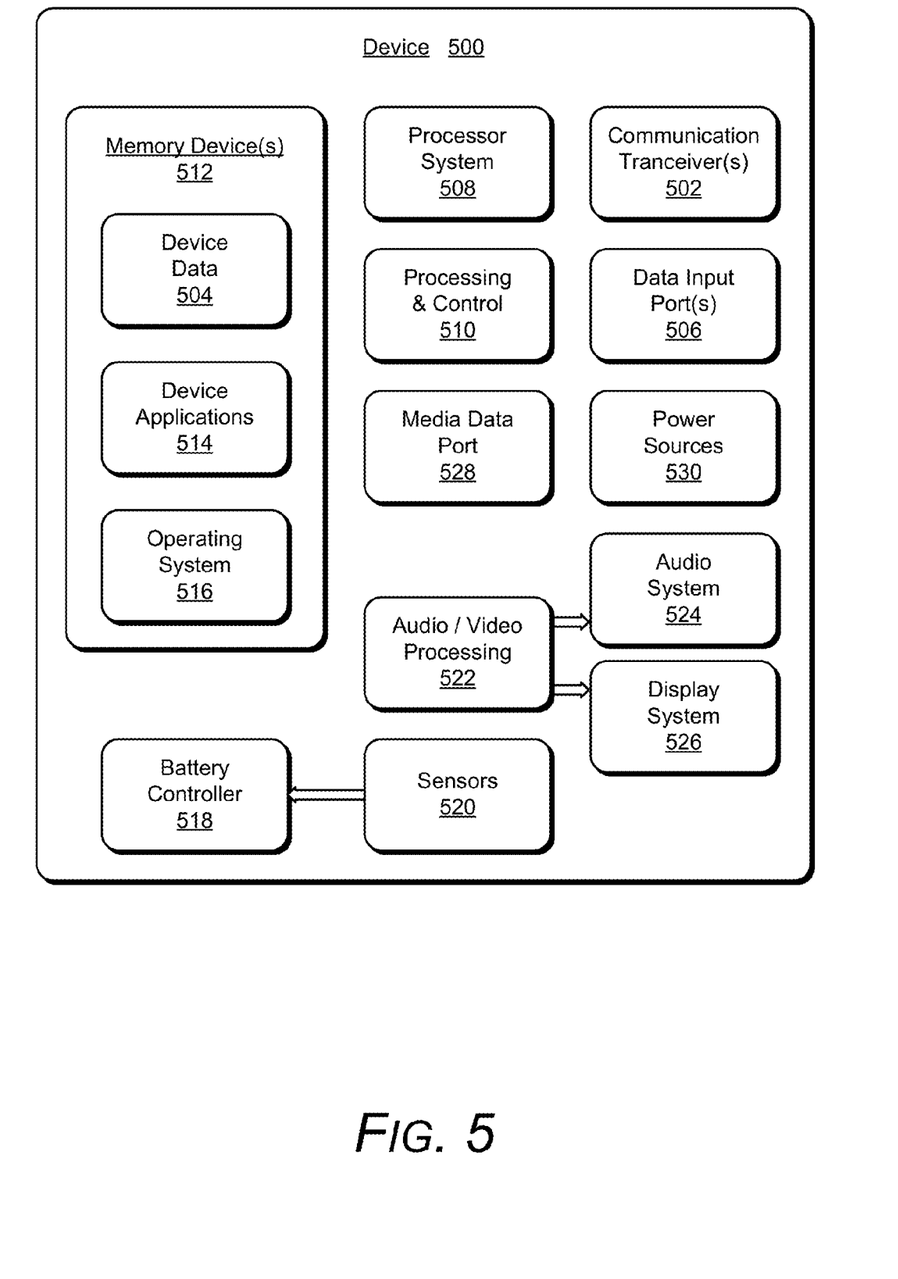
FIG. 5 illustrates various components of an example device that can implement embodiments of battery disconnect safeguard.

FIG. 5 illustrates various components of an example device 500 in which embodiments of battery disconnect safeguard can be implemented. The example device 500 can be implemented as any of the computing devices described with reference to the previous FIGS. 1-4, such as any type of client device, mobile phone, tablet, computing, communication, entertainment, gaming, media playback, and/or other type of device. For example, the mobile device 100 shown in FIG. 1 may be implemented as the example device 500.

The device 500 includes communication transceivers 502 that enable wired and/or wireless communication of device data 504 with other devices. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 500 may also include one or more data input ports 506 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 500 includes a processing system 508 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 510. The device 500 may further include any type of a system bus or other data and command transfer system that couples the various components within the device. A system bus can include any one or combination of different bus structures and architectures, as well as control and data lines.

The device 500 also includes computer-readable storage memory 512 that enable data storage, such as data storage devices that can be accessed by a computing device, and that provide persistent storage of data and executable instructions (e.g., software applications, programs, functions, and the like). Examples of the computer-readable storage memory 512 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 500 may also include a mass storage media device.

A computer-readable storage memory 512 provides data storage mechanisms to store the device data 504, other types of information and/or data, and various device applications 514 (e.g., software applications). For example, an operating system 516 can be maintained as software instructions with a memory device and executed by the processing system 508. The device applications may also include a device manager, such as any form of a control application, software application, signal-processing and control module, code that is native to a particular device, a hardware abstraction layer for a particular device, and so on. In this example, the device 500 includes a battery controller 518 that implements embodiments of battery disconnect safeguard, and may be implemented with hardware components or in software, such as when the device 500 is implemented as the mobile device 100 described with reference to FIGS. 1-4. An example of the battery controller 518 is the battery controller 110 that is implemented by the mobile device 100.

The device 500 also includes sensors 520 that input sensor data to the battery controller 518. The sensors 520 may be implemented as any one or combination of an accelerometer, gyro, touch contact sensors, a moisture detector, temperature detector, and/or any other type of environmental condition sensors, as described with reference to the sensors 124 shown in FIG. 1. Additionally, any one or more of the sensors 520 may be positioned in the device, in an accessory (e.g., in a device protective cover), or both in the device and in a cover.

The device 500 also includes an audio and/or video processing system 522 that generates audio data for an audio system 524 and/or generates display data for a display system 526. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 528. In implementations, the audio system and/or the display system are integrated components of the example device. Alternatively, the audio system and/or the display system are external, peripheral components to the example device.

The device 500 can also include one or more power sources 530, such as when the device is implemented as a mobile device. The power sources may include a charging and/or power system, and can be implemented as a flexible strip battery, a rechargeable battery, a charged super-capacitor, and/or any other type of active or passive power source.

Although embodiments of battery disconnect safeguard have been described in language specific to features and/or methods, the subject of the appended claims is not necessarily limited to the specific features or methods described. Rather, the specific features and methods are disclosed as example implementations of battery disconnect safeguard, and other equivalent features and methods are intended to be within the scope of the appended claims. Further, various different embodiments are described and it is to be appreciated that each described embodiment can be implemented independently or in connection with one or more other described embodiments.

The invention claimed is:

1. A system, comprising:
  a primary battery configured as a power source to power components of a mobile device;
  a secondary battery configured as an additional power source to power the components of the mobile device; and
  a battery controller configured to:
    receive a sensor input of detected moisture proximate a battery connection of the secondary battery;
    determine an impending secondary battery disconnect event due to the secondary battery shorting out as a result of exposure to the detected moisture;
    determine that the primary battery is functional as the power source without the exposure to the detected moisture and without an impending primary battery disconnect event; and
    initiate a battery switch circuit switching from the secondary battery to the primary battery as the power source based on the sensor input of the detected moisture and the impending secondary battery disconnect event.

2. A system as recited in claim 1, further comprising a moisture detector configured to detect the moisture proximate the battery connection of the secondary battery in the mobile device.

3. A system as recited in claim 2, wherein the moisture detector is configured to at least one of detect the moisture on a circuit board that implements the battery controller, or detect the moisture at the battery connection of the secondary battery.

4. A system as recited in claim 1, wherein the secondary battery is one of:
  integrated within the mobile device;
  integrated in a removable housing cover of the mobile device;
  connected to contacts that are integrated in a housing of the mobile device;

integrated in a protective cover or case for the mobile device; or external to the mobile device.

5. A system as recited in claim 1, wherein the battery controller is configured to:

monitor a charge level of the primary battery; and maintain at least a minimum charge level of the primary battery to enable the switch from the secondary battery to the primary battery as the power source.

6. A system as recited in claim 1, wherein the battery controller is implemented with hardware components configured to receive a moisture detection input as the sensor input and initiate the battery switch circuit switching from the secondary battery to the primary battery.

7. A system as recited in claim 1, further comprising a memory and processing system to implement the battery controller as software that is configured to receive a moisture detection input as the sensor input and initiate the battery switch circuit switching from the secondary battery to the primary battery.

8. A system as recited in claim 1, wherein the battery controller is configured to:

determine that the primary battery functions as the power source without the exposure to the detected moisture and without an impending primary battery disconnect event.

9. A method, comprising:

powering components of a mobile device with a secondary battery as an additional power source to a primary battery that is configured to power the components of the mobile device;

detecting moisture proximate a battery connection of the secondary battery, the detected moisture indicating an impending secondary battery disconnect event due to the secondary battery shorting out; and switching from the secondary battery to the primary battery as the power source of the mobile device based on a sensor input of the detected moisture proximate the battery connection of the secondary battery.

10. A method as recited in claim 9, further comprising:

switching back from the primary battery to the secondary battery based on the moisture proximate the battery connection no longer being detected.

11. A method as recited in claim 9, further comprising:

receiving the sensor input of the detected moisture in the mobile device from a moisture detector.

12. A method as recited in claim 9, wherein said detecting the moisture comprises at least one of:

detecting the moisture on a circuit board that implements a battery controller configured to control said switching from the secondary battery to the primary battery; and detecting the moisture comprises detecting the moisture at the battery connection of the secondary battery.

13. A method as recited in claim 9, further comprising:

monitoring the charge level of the primary battery; and maintaining at least a minimum charge level of the primary battery to enable said switching from the secondary battery to the primary battery as the power source.

14. A mobile device, comprising:

a battery configured as a power source to power components of the mobile device;

a sensor configured to detect moisture proximate a battery connection of the battery, the detected moisture indicating an impending battery disconnect event due to the battery shorting out as a result of exposure to the detected moisture; and a battery controller configured to initiate a battery switch circuit switching the power source of the mobile device based on the detected moisture, the power source switched to an additional power source without the exposure to the detected moisture to maintain power for the components of the mobile device.

15. A mobile device as recited in claim 14, wherein:

the sensor is a moisture detector configured to detect the moisture proximate the battery connection of the battery; and the battery controller is configured to receive a sensor input of the detected moisture from the moisture detector.

16. A mobile device as recited in claim 14, wherein the sensor is configured to at least one of detect the moisture on a circuit board that implements the battery controller, or detect the moisture at the battery connection of the battery.

17. A mobile device as recited in claim 14, wherein:

the battery is a secondary battery configured as the additional power source to power the components of the mobile device;

the battery controller is configured to:

switch from the secondary battery to a primary battery as the power source based on the detected moisture; and switch back from the primary battery to the secondary battery as the power source based on the moisture proximate the battery connection no longer being detected.

18. A mobile device as recited in claim 17, wherein the battery controller is configured to:

monitor a charge level of the primary battery; and maintain at least a minimum charge level of the primary battery to enable the switch from the secondary battery to the primary battery as the power source.

19. A mobile device as recited in claim 14, wherein the battery controller is implemented with hardware components configured to receive a moisture detection input from the sensor and switch the power source.

20. A mobile device as recited in claim 14, further comprising a memory and processing system to implement the battery controller as software that is configured to receive a moisture detection input from the sensor and switch the power source.

* * * * *